United States Patent [19]

Bergkvist

[11] 4,142,387
[45] Mar. 6, 1979

[54] IDENTIFICATION DEVICE

[76] Inventor: Lars A. Bergkvist, Gottne, 890 42 Mellansel, Sweden

[21] Appl. No.: 847,712

[22] Filed: Nov. 2, 1977

[30] Foreign Application Priority Data

Nov. 19, 1976 [SE] Sweden ............................ 76129774

[51] Int. Cl.² ............................................ E05B 49/00
[52] U.S. Cl. ..................................................... 70/278
[58] Field of Search ................ 70/118, 120, 277, 278, 70/280, 282; 250/555, 556, 569; 340/274 C; 356/71, 158, 160, 167, 168, 171

[56] References Cited

U.S. PATENT DOCUMENTS 3,733,862 5/1973 Killmeyer ............................ 70/277
3,797,936 3/1974 Dimitriadis ........................... 356/71

Primary Examiner—Robert L. Wolfe
Attorney, Agent, or Firm—Silverman, Cass & Singer, Ltd.

[57] ABSTRACT

A device for identifying a coded key or the like. A coded key member is inserted into a housing. A Moire interference pattern is produced by a first screen positioned on the key to be moved into registry with a second screen mounted in the housing. The first screen forms non-readable coded information and the second screen forms a code-key. Decoded information produced by the Moire interference pattern is opto-electrically read and a corresponding electrical signal is generated.

8 Claims, 7 Drawing Figures

IDENTIFICATION DEVICE

BACKGROUND OF THE INVENTION

This invention relates to a device for identifying, for example, the indentity of a person, a specific number such as a bank account number, or for controlling in various connections that a first portion of the identification device belongs to a second portion of the device, as for example in the case of key and lock.

The device according to the invention, thus, can be used for providing an identity card, credit card or corresponding card for automatic cash withdrawal from a bank account with information about the owner, account number, etc. According to the technique heretofore used for applying such information to such documents, the card etc. is provided with a magnitizable strip, to which the information is applied, for example by known technique of tape recording.

The present invention offers great advantages in cases when, as mentioned above, a first part is identified in relation to a second part, as in the case of key and lock. Conventional locks for apartments, doors in general etc. are designed so, that a metallic key with a code in the form of having a substantial profile on one side is identified relative to a latch bolt, which includes a corresponding code in the form of the position of tumblers or the position of pins between two concentric cylinders, as in the case of the well-known safety lock. It was found, however, that these types of locks relatively simply can be forced open by a person, for example, who tries to unduely enter a locked room. This has resulted in the development of locks more difficult to force open, for example by increasing the number of tumblers in the locks.

There exist also electric combination locks which, however, show the disadvantage that the combination must be memorized unaccessible to all except those having admittance to the room in question. In most cases, moreover, a spread of the knowledge of the combination cannot be prevented.

SUMMARY OF THE INVENTION

The advantages offered by the present invention are described in the following.

The present invention relates to an identification device comprising a first part and a second part, the first part provided with a first member containing a coded information, for example consisting of a name, number etc., and the second part provided with a second member containing a code key for converting in co-operation with the first member the coded information to a readable coded information.

The invention is characterized in that said first and said second member consist of one or more screen areas, each comprising opaque lines separated by transparent interspaces, that said information is stored thereby that the width of said transparent interspaces varies depending on the content of the information, and said second screen is designed so as together with the first screen to convert said coded information by forming an interference pattern, a so-called moire pattern, when the two screens are being lighted through, which pattern is readable by a reading means capable to emit electric signals containing the information stored on the first part.

BRIEF DESCRIPTION OF THE DRAWING

The invention is described in greater detail in the following, with reference to the accompanying drawing, in which.

DESCRIPTION OF THE PREFERRED EMBODIMENT

Figure 1:
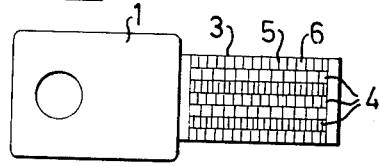
FIG. 1 shows a first part of the device according to the invention.
Figure 2:
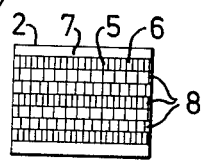
FIG. 2 shows a second part of the device.

In FIG. 1, the first part of the identification device is designated by 1, and in FIG. 2 its second part is designated by 2. The first part 1, which in FIG. 1, for example, is a key, is provided with a first member 3 consisting of one or more parallel areas 4 of screen, each comprising opaque lines 5 separated by transparent interspaces 6. The second part 2 is provided with a second member 7, which in a corresponding manner comprises one or more parallel areas 8 of screen. The opaque lines 5 preferably are arranged so that their length is corresponded by the width of the respective screen area. The opaque lines 5 of the screens 4, 8 preferably have a very small width, for example 0.005 mm, and the transparent interspaces 6 preferably have a smaller width than the opaque lines, for example as small as 0,001 mm.

Figure 3:
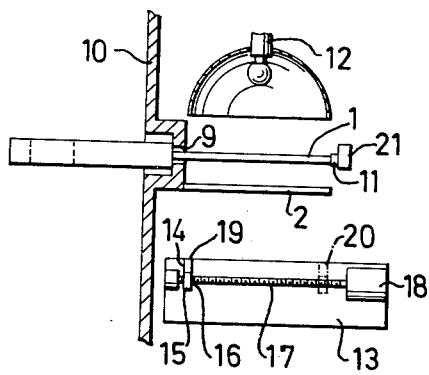
FIG. 3 shows schematically a means for co-operation between said two parts and a reading means.
Figure 5:
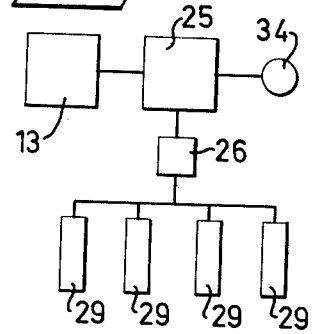
FIG. 5 is a block diagram for a locking device.

According to the invention, the two parts 1, 2 are arranged to cooperate so that the members 3, 7 thereon are lighted through while they are positioned in parallel with each other, so that the surface of one member 3 entirely covers the surface of the second member 7, and so that substantially parallel light is directed perpendicularly to the screen surfaces of the members 3, 7, as shown in FIG. 3. In a wall, for example an outer wall 10 in FIG. 3, a groove 9 is shown, into which the first part 1 is intended to be inserted against a stop member 11. The second part 2 is mounted stationary in relation to the wall 10. A lighting means 12 comprised in a reading means emits substantially parallel light. Said lighting means is disposed with its optical axis perpendicularly to the screen areas of the parts and on one side of the two parts 1, 2. On the other side of said parts 1, 2 in relation to the lighting means 12 a second portion of the reading means 13 is located which comprises a plurality of light-sensitive elements 14, for example phototransistors, which are provided to scan at least a portion of the surface of the screens 4, 8. According to one embodiment, one light-sensitive element 14 per screen area 4, 8 is provided, i.e. seven elements in the FIGS. 1, 2, 4, where each of the elements 14 is capable during its scanning of the surface of the screens to move relative to the surface of the screens 4, 8. Each light-sensitive element 14 may be attached, for example, to a member 15, in which a threaded hole 16 is provided, and a threaded axle 17 extending through said hole is driven by an electric motor 18. Upon rotation of the motor 18, and therewith of the axle 17, the member 15, and therewith the light-sensitive element 14, are moved relative to the screen surfaces, for example from a position 19 to a position 20, shown by dashed line, so that one of seven screen areas 4, 8 is scanned by each light-sensitive element 14.

A scanning period, comprising a.o. ignition of the lighting means 12 and start of the motors 18, is initiated by a switch 21, which is a portion of said stop member 11 and, thus, is actuated by the front edge of the first part.

The screen 4 of the first part 1 is designed so that the width of the transparent interspaces varies in size from one interspace to the other, the distribution of the width of the different transparent interspaces 6 constituting the contet of the information. The information, thus, is coded and may comprise name, number etc. or a code without special importance. The screen 8 of the second part 2 is designed in a corresponding mannner. Also this screen, thus, can be coded and be intended together with the screen 4 of the first part 1 to give rise to an inteference pattern, a so-called moire pattern, when the screens are being lighted through, from which pattern the stored information can be read in coded state. Moire patterns in general are described in the Swedish Pat. specification No. 7307577-2.

The screen 8 of the second part 2, thus, is a code key for converting the coded information stored in the screen 4 of the first part 1 to a readable coded information. Without knowing the design of the screen 8 of the second part 2, the code concerning the screen 4 of the first part 1 cannot be solved and, thus, its information not be read.

For producing a first screen 4 containing information, which together with a second screen 8 is intended to render a readable coded information, the screens are applied by a known holographic method. At this method laser light sweeps over the screen surfaces to be and produces the screens. The sweep and intensity of the laser light is controlled by a computer, which is programmed to convert an information expressed in fully written out text to a screen pattern according to a certain given code, in such a manner, that the information together with the screen 8 of the second part 2 brings about an interference pattern, which is readable and interpretable by a given code. Owing to this technique and the dimensions stated above for the screen lines 5 and interspaces 6, the amount of informaion which can be stored in a screen, is very great.

Figure 4:
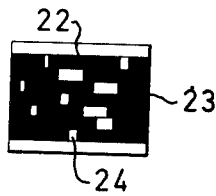
FIG. 4 shows an interference pattern produced by the two parts in co-operation.

FIG. 4 shows by way of example an interference pattern 22 consisting of dark portions 23 and light portions 24. Such an inteference pattern 22 is much simpler than the most complicated ones which can be produced. The information in this case consists of the size and the location of said light portions 24. By the reading means 13, 12 as mentioned above, for example, the light-sensitive elements 14 can scan the interference pattern from the left to the right in FIG. 4, and their output signals will vary depending on whether they are at a dark portion 23 or a light portion 24. The output signal from the scanning means, therefore, preferably will consist in this case of a plurality of pulses of varying height and length, depending on the light intensity and length of said portions. The output signal is fed to a suitable decoding means 25 capable to decode the coded output signal, the signal being used by known technique in a way determined by the object of the information.

According to a second embodiment, the light-sensitive elements 14 are adjustably, but stationary located in relation to the screen 8 of the second part 2, and the elements scan whether the locations of said light portions 24 or dark portions 23 in the interference pattern 22 coincide with the position of one or more of the light-sensitive elements 14. The decoding means 25 in this case can be given a considerably simpler design than at the firstmentioned embodiment. Said means then is capable, upon the emittence of a signal from one or more of the light-sensitive elements, to emit, when the inteference pattern produced satisfies a predetermined pattern, in known manner a signal to a unit 26 regarding which of the light-sensitive elements 14 emit a signal to the decoding means 25.

The number of combination possibilities for the locations of the light portions 24 and the dark portions 23, respectively, is of course very great.

Figure 6:
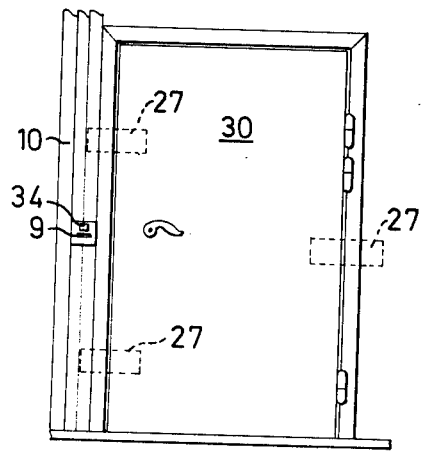
FIG. 6 shows a door with said locking device applied thereto.
Figure 7:
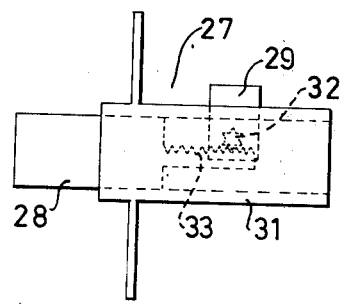
FIG. 7 is a schematic view of a tumbler associated with said locking device.

The identification device according to the present invention, as mentioned above, very suitably can be used as the identifying device in a lock. The first part 1 is a part removable from the device and comparable with a key. The second part 2 and said scanning means 12, 13 are stationary mounted in a wall 10, preferably in connection to a door 30, for which the lock is intended to be used, as partially is apparent from FIG. 6. When the first part 1, i.e. the key, is identified by the scanning means 12, 13 as belonging to the second part 2, the decoding means 25 emits a signal to the unit 26, which in this case is a switch. The switch 26 then, upon receiving said signal, closes a circuit to one or more locking members, generally designated in FIG. 7 by 27. Each member includes a latch bolt 28, which by action of an electro-magnetic means 29, for example an electric motor, is moved so that said latch bolt 28 is moved outside the door 30 and thereby renders it possible to open the door. At one embodiment, the latch bolt 28 is movable in a housing 31 enclosing the bolt entirely or partially. The outgoing shaft of the electric motor 29 is provided with pinions 32, which engage with a corresponding rack 22 rigidly attached to the latch bolt. The housing 31 can be secured to the doorcase extending around the door 30 and to the walls. Alternatively, for example, pull magnets can be used for moving a latch bolt. Said lock offers the great advantage that the locking member 27 can be positioned on one or both sides of the door, as appears from FIG. 6, but also at the upper and/or lower edge of the door, because the locking member 27 is only electrically connected to the identification device.

When the device is used as identifying device at locks for doors, preferably a switch 34 is provided in connection to the location of the groove 9 for locking the door. Furthermore, it should be possible (not shown) from outside to make alive the device by means of batteries, in the event of a longer circuit break. The device usually is connected preferably in its entirety to the normally available mains. The decoding means 25 and the switch 26 also can be positioned unaccessible from outside, for the case that the part of the device accessible from outside is subjected to brute force.

For rendering it possible that the first part 1 at the reading is located as described above in relation to the second part 2, the slot, into which the first part 1 is inserted, preferably is provided with guide bars or the like, which are intended to abut the screen-free surfaces of the first part 1. The first part 1 is made of a transparent plastic material with high wear resistance. The screens 4 preferably are so embedded that they cannot be damaged by external action or wear.

When the invention is applied at identity documents, credit cards etc., preferably reading means movable relative to the first part 1 and the second part 2 as described above are used. The document in question preferably is designed so that a strip adjacent the short or long side of the document is provided with a screen of the above kind. As regards the identification device, the number of parallel screens to be arranged on the parts 1 and 2, respectively, depend on the amount of information to be stored. In certain cases it may be fully sufficient with only one screen area instead of seven, as shown in FIGS. 1, 2, 4.

The device according to the invention, of course, can be modified within the scope defined by the attached claims. The screens, for example, can be designed with screen lines angular to the longitudinal direction of the two parts. The reading means, furthermore, can be modified so as to be suitable for every application of the device.

I claim:

1. An identification device comprising a housing, a key-like member insertable into the housing, a first screen provided on the member and a second screen mounted in the housing to be in registry with the first screen when the member is inserted into the housing, said screens including a series of line indicia to cooperatively produce a moire inteference pattern when the first screen is moved into registry with the second screen, the indicia lines of the first screen being spaced to form non-readable coded information and the indicia lines of the second screen being spaced to form non-readable code-key information, the moire interference pattern produced by registry of the screens being readable decoded information of the first screen, and means positioned adjacent the two screens for reading the decoded information of the moire pattern and generating a first electrical signal in response thereto.

2. An identification device according to claim 1 wherein the means for reading include illumination means positioned adjacent one side of the two screens for illuminating the moire interference as it is produced and a plurality of photo-transistors positioned adjacent the two screens on a side of the two screens opposite the illumination means for detecting the moire interference pattern produced and generating an electrical signal in response thereto.

3. An identification device according to claim 1 wherein the series of line indicia are arrayed normal to the width of the two screens.

4. An identification device according to claim 1 wherein the moire interference pattern produced includes a plurality of light portions and a plurality of dark portions corresponding to the decoded information of the first screen.

5. An identification device according to claim 2 wherein the means for reading move in relation to the screens during scanning of the moire interference pattern.

6. An identification device according to claim 2 wherein the means for reading are stationary in relation to the screens during scanning of the moire interference pattern.

7. An identification device according to claim 1 wherein the housing is positioned adjacent a door, and further comprising, means for locking the door positioned at an edge of the door and connected to the electrical signal from the reading means and acting in response thereto.

8. An identification device according to claim 7 wherein the locking means include means for comparing the information contained in the first electrical signal with predetermined information and generating a second electrical signal in response thereto, switching means responsive to the second electrical signal, electromotive means responsive to said switching means for moving a latch bolt into the edge of the door, and a latch bolt for locking the door positioned in a door jamb and movable into an edge of the door for locking the same.

* * * * *